United States Patent [19]

Howard

[11] 3,799,728
[45] Mar. 26, 1974

[54] MOLD CLOSING DEVICE FOR FABRIC MOLDING

[75] Inventor: Jack E. Howard, Los Angeles, Calif.

[73] Assignee: International Fabric Molders, Inc., Los Angeles, Calif.

[22] Filed: May 18, 1972

[21] Appl. No.: 254,492

[52] U.S. Cl. ......... 425/416, 425/450, 425/DIG. 222, 425/406
[51] Int. Cl. .............................................. B29c 3/00
[58] Field of Search ........... 425/450, 416, DIG. 205, 425/DIG. 220, DIG. 222

[56] References Cited
UNITED STATES PATENTS

| | | | |
|---|---|---|---|
| R27,137 | 6/1971 | Brown et al. | 425/DIG. 220 |
| 3,335,463 | 8/1967 | Allard et al. | 425/DIG. 222 |
| 3,559,235 | 2/1971 | Hagen | 425/DIG. 205 |
| 3,327,622 | 6/1967 | Lebovitz | 425/DIG. 220 |
| 3,000,429 | 9/1961 | Warnken | 245/DIG. 220 |
| 3,667,890 | 6/1972 | Rusmini | 425/DIG. 222 |
| 2,680,893 | 6/1954 | Glaab et al. | 425/416 |

*Primary Examiner*—Robert L. Spicer, Jr.
*Attorney, Agent, or Firm*—Robert C. Comstock

[57] ABSTRACT

A mold closing device which supplements the normal mold closing action of a press for fabric molding. The device comprises a pair of pistons and cylinders extending horizontally beneath a support member on which mold parts are mounted for vertical movement. The cylinders and pistons are pivotally connected to pairs of lower and upper lever arms, the outer ends of which are pivotally connected to the press and to the four corners of the support member respectively. The cylinders are operated to move the pistons horizontally and exert vertical pressure upon the support member through the pivoting arms to cause sudden forceful closing of the molds.

3 Claims, 4 Drawing Figures

MOLD CLOSING DEVICE FOR FABRIC MOLDING

BACKGROUND OF THE INVENTION

1. Field of the Invention

The invention relates to a mold closing device which is particularly adapted for use in molding flat pieces of fabric into three dimensional shapes for use as breast cups, brassieres, swim suits and other garments or parts thereof.

2. Description of the Prior Art

In the prior art, molds are closed in a conventional manner, customarily through the use of a hydraulic ram or other single closing member. Such a ram may be too slow in closing, permitting the fabric and/or molds to cool before the mold is completely closed. This results in poor and incomplete molding of the fabric or other material being molded, as well as a waste of heat.

Conventional mold closing methods, structures and techniques also do not close the molds with a sufficient amount of force, which is necessary and desirable to provide better definition of the molded pattern and a stronger and more effective molding operation.

SUMMARY OF THE INVENTION

The primary object of the present invention is to provide a new and improved mold closing device which is particularly adapted for use in fabric molding.

The invention provides a mold closing device which supplements and acts as a booster for the conventional mold closing means to provide added speed, strength and pressure to the mold closing operation.

Among the advantages provided by the present invention are faster mold closing, which is important in order to preserve heat and to accomplish the molding operation before the material and/or molds become cool.

Another advantage of the invention is that it provides for greater impact and pressure in the mold closing operation. This provides a far better and more complete molding operation, with better definition facilities and simplifies manufacturing operations which are performed subsequently to the molding.

It is accordingly among the objects of the invention to provide a mold closing structure having all of the advantages and benefits set forth above and described in further detail hereinafter in this specification.

It is also among the objects of the invention to provide such a mold closing device which is simple in its structure and operation and which will perform satisfactorily over long periods of time without breakdown or repairs.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE PREFERRED EMBODIMENT

Figure 1:
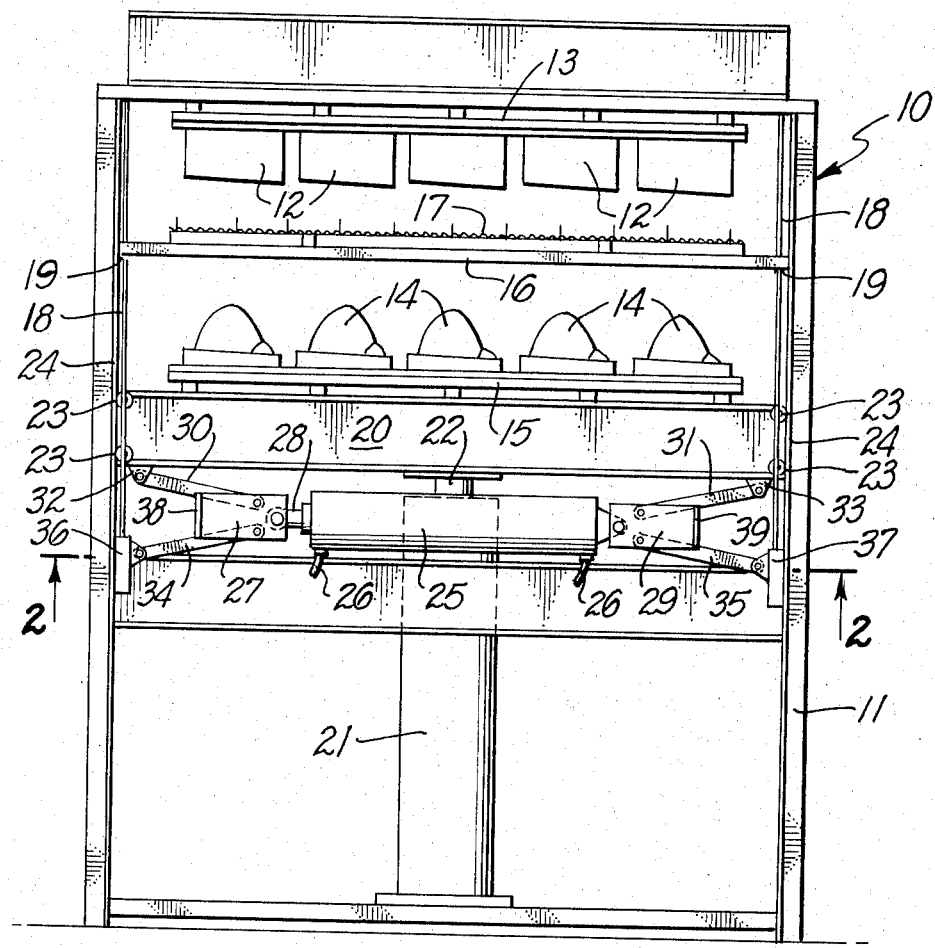
FIG. 1 is a front elevational view of a fabric molding press using the mold closing device of the present invention, the molds being open.
Figure 2:
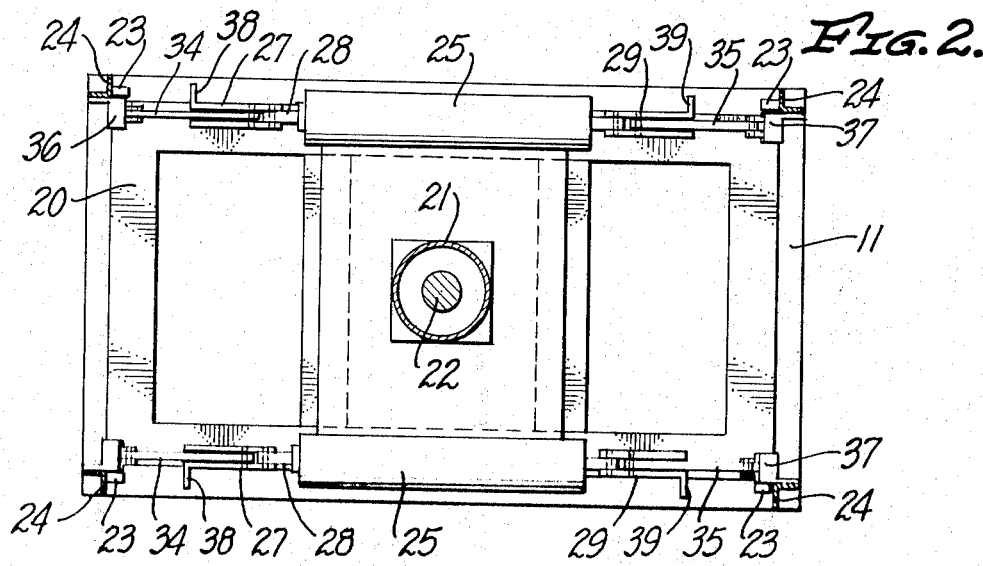
FIG. 2 is a sectional view of the same taken on line 2—2 of FIG. 1.

A preferred embodiment which has been selected to illustrate my invention is adapted to be utilized with a conventional hydraulic molding assembly or press 10, which includes a framework 11. A plurality of downwardly facing female mold halves 12 are mounted on a stationary platen 13 adjacent to the top of the press 10. A plurality of upwardly facing male mold halves 14 are mounted on a movable platen 15 adjacent to the center of the press 10.

A rack 16 which is disposed between the platens 13 and 15 is adapted to hold one or more layers of fabric 17. The rack 16 is mounted for reciprocal vertical sliding movement on a plurality of vertically directed guide rods 18. The rods 18 carry stops 19 which limit the downward movement of the rack 16.

The movable platen 15 is mounted on a rectangular support member 20. A hydraulic ram 21 has the upper end of its piston 22 connected to the bottom of the support member 20.

Mounted adjacent to the upper and lower edges of each corner of the support member 20 are a pair of rollers 23 which rotatably engage vertically directed angle irons 24 which comprise part of the framework 11 of the press 10.

Extending horizontally beneath the front and back of the support member 20 are a pair of hydraulic cylinders 25. Connections 26 are provided at each end of the cylinders 25 for supplying or withdrawing hydraulic fluid to control the extension or retraction of the pistons 28 of the cylinders 25. While air operation is believed to be preferable, liquid or any suitable hydraulic fluid may be used to operate the cylinders.

One end of each of the cylinders 25 is pivotally attached to the inner end of a first horizontally directed plate 27. The end of the piston 28 of each cylinder 25 is pivotally attached to a second horizontally directed plate 29. A pair of diagonally directed upper arms 30 and 31 are pivotally attached at their inner ends to the plates 27 and 29 respectively. The outer ends of the upper arms 30 and 31 are pivotally connected to flanges 32 and 33 respectively which extend downwardly from the opposite ends of the support member 20.

A pair of diagonally directed lower arms 34 and 35 are pivotally attached at their inner ends to the plates 27 and 29. The outer ends of the lower arms 34 and 35 are pivotally attached to a pair of flanges 36 and 37 respectively which are secured to the midportion of the framework 11.

In use, the opening and closing of the molds is effected primarily by the piston 22 of the ram 21, which moves the support member 20 upwardly. The male molds 14 engage and carry the fabric 17 and rack 16 upwardly and the male molds 14 move into engagement with the complementarily formed female molds 12, with the fabric 17 disposed between them. As the support member 20 is moved upwardly, the rollers 23 move along the angle irons 24 to guide the support member 20 in its upward movement, while reducing friction.

Figure 3:
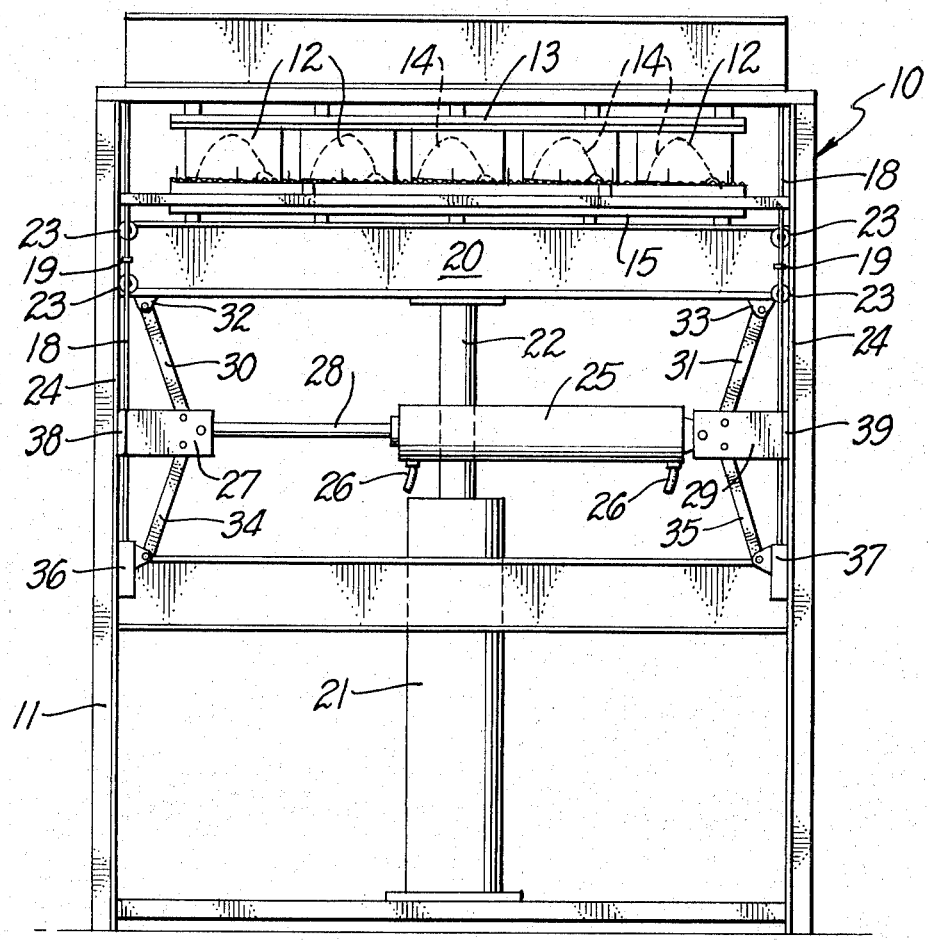
FIG. 3 is a view similar to FIG. 1, the molds being closed.
Figure 4:
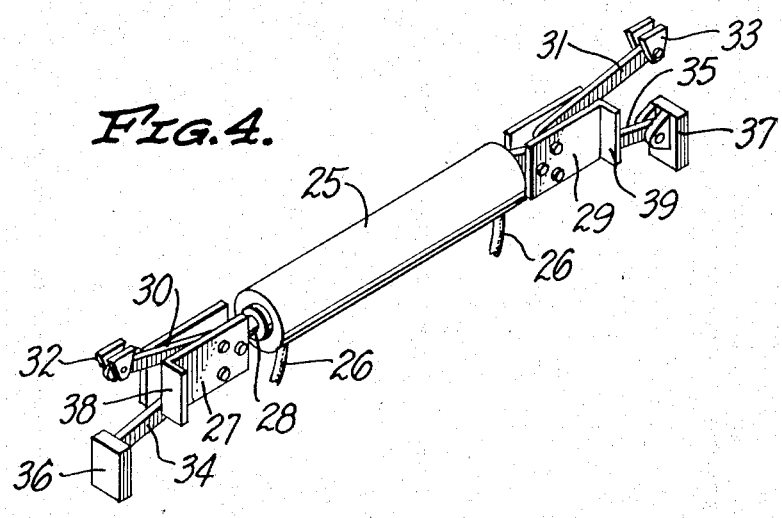
FIG. 4 is an isometric view of the linkage assembly.

The flanges 32 and 33 move upwardly with the support member 20 and carry the outer ends of the upper arms 30 and 31 upwardly. This moves both the upper and lower arms from the substantially horizontal position shown in FIG. 1 to the substantially vertical position shown in FIG. 3. The arms in turn move the plates 27 and 29 horizontally outwardly toward the sides of the framework 11. The plates 27 and 29 carry projecting stop members 38 and 39 respectively which are adapted to engage the framework 11 to limit the outward movement of the plates 27 and 29.

When the piston 22 has almost reached the end of its stroke and the molds 12 and 14 are almost closed, the mold closing device of this invention is operated. The cylinders 25 are supplied with fluid to cause their pistons 28 to move outwardly and thereby move the plates 27 and 29 outwardly with a large amount of force. This outward force is translated by the arms into upward force which is exerted simultaneously against all four corners of the support member 20 to cause its sudden upward movement with substantial force. This movement supplements and adds to the normal closing force exerted by the piston 22. The male mold halves 14 are thereby moved quickly and forcefully into engagement with the female mold halves 12, with the fabric 17 disposed between them. This sudden and forceful closing of the molds provides a stronger molding action and better definition of the molded configuration of the fabric. It also somewhat lessens the dissipation of heat from the fabric 17.

After the molding operation is completed, the pistons 28 of cylinders 25 and the piston 22 of ram 21 are released and the support member 20 moves back down to its normal position.

The pivotally mounted upper and lower arms act as linkage means and provide leverage or mechanical advantage which increases the amount of force causing the molds to close.

I claim:

1. In a molding press for use in molding flat pieces of fabric into three dimensional shapes for use in garments, in which mold parts are mounted on a movable substantially rectangular support member for vertically upward movement by a main hydraulic ram into a closed position with respect to complementary stationary mold parts, the improvement comprising a mold closing device which supplements the normal mold closing action of said ram, said device including a pair of hydraulically operated cylinders and reciprocable pistons extending substantially horizontally beneath the front and rear edges of said support member, each of said cylinders having a pair of diagonally directed upper arms pivotally connected at their outer ends to said support member adjacent to the opposite corners thereof and having their inner ends pivotally connected one to said cylinder and one to said piston for outward movement thereby, each of said cylinders having a pair of diagonally directed lower arms pivotally connected at their outer ends to fixed portions of said press on opposite sides thereof and having their inner ends pivotally connected one to said cylinder and one to said piston respectively, and means for energizing both of said cylinders simultaneously after said support member has been moved to a substantially closed position with respect to said stationary mold parts, to provide sudden forceful and equal final closing movement of all four corners of said support member to force said support member and the fabric being molded against said stationary mold parts and thereby provide a stronger molding action and better definition of the molded configuration of the fabric.

2. The structure described in claim 1, and a plate connected to the outer end of each of said cylinders and pistons, the inner ends of said arms being pivotally connected to said plates.

3. The structure described in claim 2, and a pair of rollers mounted on the upper and lower portion of each of the four corners of said support member, said rollers being engageable with vertically directed stationary portions of said press to facilitate the vertical movement of said support member.

* * * * *